(12) United States Patent
Jiao et al.

(10) Patent No.: US 11,011,797 B2
(45) Date of Patent: May 18, 2021

(54) ELECTRODE ASSEMBLY AND BATTERY

(71) Applicant: Ningde Amperex Technology Limited, Fujian (CN)

(72) Inventors: Weimin Jiao, Fujian (CN); Junhui Hou, Fujian (CN); Houlei Cui, Fujian (CN); Yinli Lin, Fujian (CN); Hui Dong, Fujian (CN); Zhiwen Xiao, Fujian (CN)

(73) Assignee: NINGDE AMPEREX TECHNOLOGY LIMITED, Fujian (CN)

( * ) Notice: Subject to any disclaimer, the term of this patent is extended or adjusted under 35 U.S.C. 154(b) by 206 days.

(21) Appl. No.: 16/238,517

(22) Filed: Jan. 3, 2019

(65) Prior Publication Data

US 2019/0252660 A1    Aug. 15, 2019

(30) Foreign Application Priority Data

Feb. 9, 2018  (CN) .......................... 201810136200.8

(51) Int. Cl.
*H01M 2/16* (2006.01)
*H01M 2/18* (2006.01)
*H01M 10/04* (2006.01)
*H01M 10/0583* (2010.01)
*H01M 50/46* (2021.01)
*H01M 50/463* (2021.01)

(52) U.S. Cl.
CPC ....... *H01M 50/461* (2021.01); *H01M 50/463* (2021.01)

(58) Field of Classification Search
CPC ........ H01M 2/168; H01M 2/18; H01M 10/04; H01M 10/0459; H01M 10/05; H01M 10/0583; H01M 10/0585; Y02E 60/10
See application file for complete search history.

(56) References Cited

U.S. PATENT DOCUMENTS

| 2011/0151307 A1 | 6/2011 | Hwang et al. |
| 2013/0171497 A1 | 7/2013 | Enomoto et al. |
| (Continued) | | |

FOREIGN PATENT DOCUMENTS

| CN | 102742060 A | 10/2012 |
| CN | 203690386 U | 7/2014 |
| (Continued) | | |

*Primary Examiner* — Brittany L Raymond
(74) *Attorney, Agent, or Firm* — Morgan, Lewis & Bockius LLP

(57) ABSTRACT

Embodiments of the present application provide an electrode assembly including a first electrode plate, a second electrode plate and a separator between the first electrode plate and the second electrode plate. The separator includes an extension portion extending to the outside of the first electrode plate and the second electrode plate in a length direction of the electrode assembly. The extension portion is provided with a glue layer including a first bonding portion extending in a width direction of the electrode assembly. The first bonding portion is parallel to the width direction. Embodiments of the present application further provide a battery. The electrode assembly and battery provided in the present application will at least reduce the risk of short circuit of the electrode assembly.

18 Claims, 11 Drawing Sheets

(56) References Cited

U.S. PATENT DOCUMENTS

| | | | |
|---|---|---|---|
| 2016/0006072 A1* | 1/2016 | Cho | ........................ H01M 2/18 |
| | | | 429/138 |
| 2016/0043374 A1 | 2/2016 | Seong | |
| 2016/0240868 A1 | 8/2016 | Warrington et al. | |
| 2017/0018753 A1 | 1/2017 | Minagata et al. | |
| 2020/0243895 A1* | 7/2020 | Zama | ................ H01M 10/0431 |

FOREIGN PATENT DOCUMENTS

| | | |
|---|---|---|
| CN | 105359322 A | 2/2016 |
| CN | 107004814 A | 8/2017 |
| CN | 107204415 A | 9/2017 |
| JP | 2003092100 A | 3/2003 |
| JP | 2004355817 | 12/2004 |
| JP | 2007201248 A | 8/2007 |

\* cited by examiner

ELECTRODE ASSEMBLY AND BATTERY

CROSS-REFERENCE TO RELATED APPLICATIONS

The present application claims priority to Chinese Patent Application No. 201810136200.8, filed on Feb. 9, 2018, the content of which is incorporated herein by reference in its entirety.

FIELD

The present application relates to the field of battery, in particular, to an electrode assembly and a battery having the electrode assembly.

BACKGROUND

Secondary batteries are widely used in various portable devices such as notebooks, mobile phones, UAVs, mobile power supplies, etc. due to their high energy density and capable of being recharged. It is common that the portable devices or batteries may suffer from droppings, in addition to other external forces. Frequently, the battery may become short-circuited and invalid after being dropped or subjected to an impact, which seriously affects the performance of the battery. Therefore, improvements are required.

SUMMARY

It is an object of the present application to provide an electrode assembly and a battery at least reduce the risk of short circuit of the electrode assembly.

Embodiments of the present application provide an electrode assembly including a first electrode plate, a second electrode plate, and a separator disposed therebetween. The separator includes an extension portion protruding outside of the first electrode plate and the second electrode plate in a length direction of the electrode assembly. The extension portion is provided with a glue layer including a first bonding portion extending in a width direction of the electrode assembly. The first bonding portion is parallel to the width direction.

According to embodiments of the present application, the glue layer is configured in a wave structure in the width direction of the electrode assembly.

According to embodiments of the present application, in a thickness direction of the electrode assembly, the extension portion includes a first layer and a second layer located on the outermost sides of the electrode assembly. The first bonding portion is located on the first layer.

According to embodiments of the present application, the glue layer further includes a second bonding portion extending in a width direction of the electrode assembly. The second bonding portion is located on the second layer.

According to embodiments of the present application, in the thickness direction of the electrode assembly, the extension portion further includes a third layer, located between the first layer and the second layer. The glue layer further includes a third bonding portion extending in the width direction of the electrode assembly. The third bonding portion is located on the third layer.

According to embodiments of the present application, in the thickness direction of the electrode assembly, the extension portion further includes a third layer, located between the first layer and the second layer. The glue layer further includes a third bonding portion extending in the width direction of the electrode assembly. The third bonding portion is located on the third layer.

According to embodiments of the present application, the glue layer further includes a fourth bonding portion, located between the first bonding portion and the second bonding portion. An angle between the fourth bonding portion and the width direction of the electrode assembly is greater than 0 degree and less than 180 degrees.

According to embodiments of the present application, the angle between the fourth bonding portion and the width direction of the electrode assembly is 90 degrees.

According to embodiments of the present application, the glue layer further includes a fourth bonding portion located between the first bonding portion and the third bonding portion, and an angle between the fourth bonding portion and the width direction of the electrode assembly is greater than 0 degree and less than 180 degrees.

According to embodiments of the present application, the angle between the fourth bonding portion and the width direction of the electrode assembly is 90 degrees.

According to embodiments of the present application, the glue layer is a discontinuous wave structure.

According to embodiments of the present application, the first electrode plate is an anode plate, and the second electrode plate is a cathode plate.

According to embodiments of the present application, a battery including an electrode assembly described above and a housing is further provided. The electrode assembly is accommodated in the housing.

The present application has the advantages as follows:

In the electrode assembly and the battery provided by the present application, the extension portion of the separator extending to the outside of the first and second electrode plates are connected by the glue layer, so that the extension portion of the separator may be bonded. Thereby effectively reduces the safety problems of the battery caused by the shrinkage of the separator (such as a drop short circuit, etc.). In addition, since the first bonding portion included in the glue layer extends in a width direction of the electrode assembly and is parallel to the width direction, the bonding portion may increase the restriction points of the extension portion of the separator when bonding. So that the extension portion of the separator may be effectively restricted, and the shrinkage of the separator is prevented, thereby reduces the risk of short circuit of the electrode assembly.

DETAILED DESCRIPTION

Figure 1:
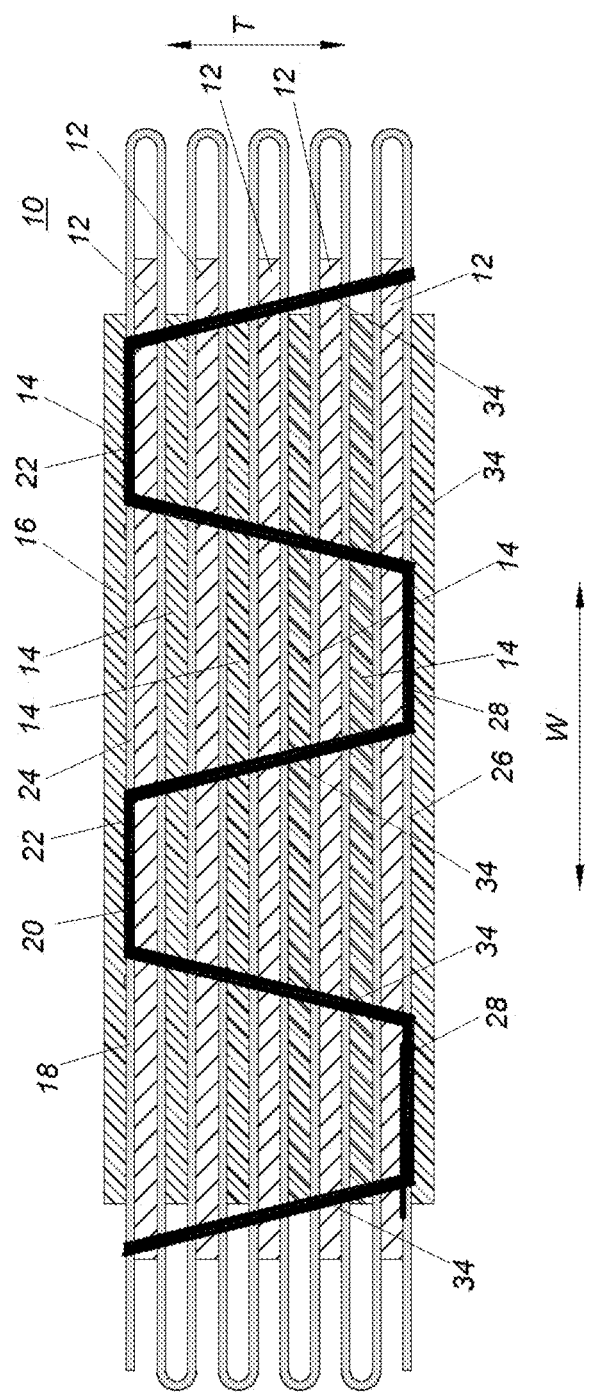
FIG. 1 is a front view of an electrode assembly according to an embodiment of the present application.

The electrode assemblies and associated batteries of the present application are described below in conjunction with the accompanying drawings. It should be understood that the various structures shown in the drawings are merely schematic structures of the present application, and are not intended to limit the present application. Other embodiments not shown or described in the disclosure are apparent to those skilled in the art through the following figures in combination with the following description.

Figure 2:
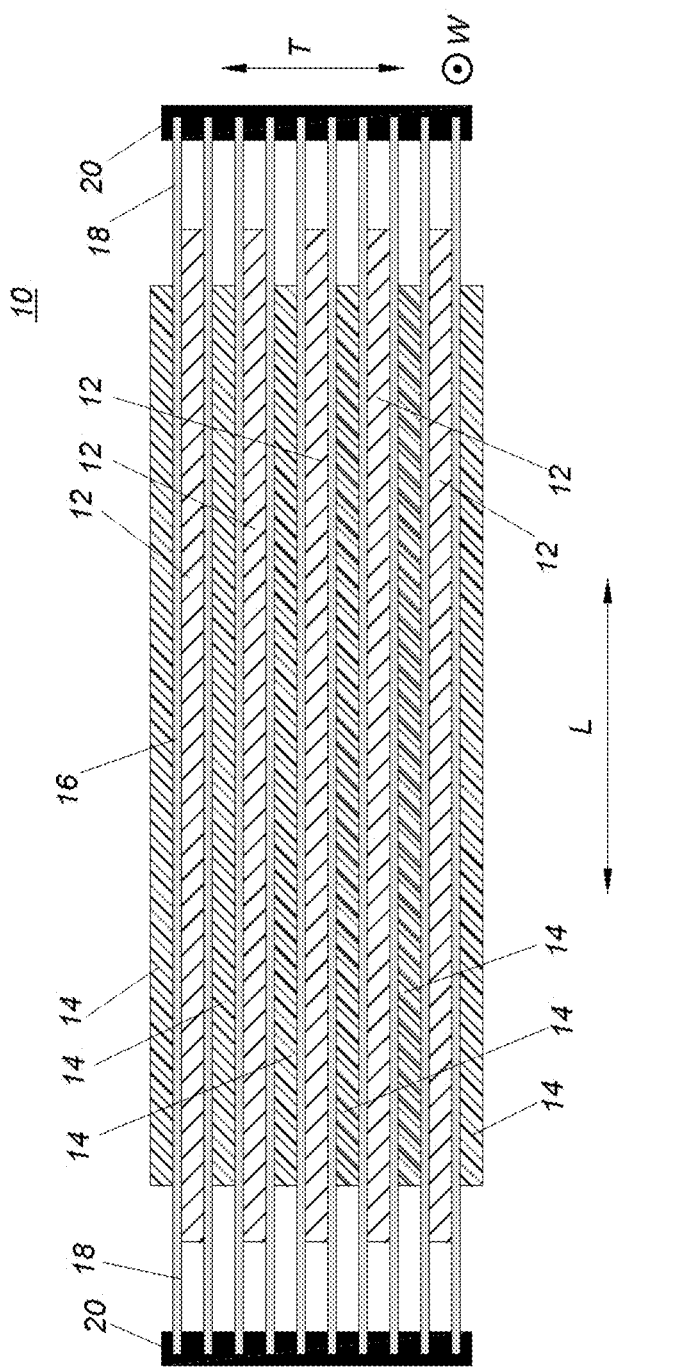
FIG. 2 is a side view of the electrode assembly of the embodiment of FIG. 1.

As shown in FIGS. 1 and 2, an embodiment of the present application provides an electrode assembly 10. The electrode assembly 10 generally includes a first electrode plate 12, a second electrode plate 14, and a separator 16. It should be understood herein that although the electrode assembly 10 shown in the illustrated embodiment is constructed as a laminated electrode assembly, in an alternative embodiment the electrode assembly may also be a wound electrode assembly. That is, the present application does not limit the specific type of the electrode assembly. In addition, it should be noted that the battery having the electrode assembly 10 of the present application described below may be, for example, a lithium ion battery. However, in an alternative embodiment, any suitable battery structure may also be used, which is not limited in the present application.

With continuous reference to FIGS. 1 and 2, in an embodiment, the separator 16 is arranged between the first electrode plate 12 and the second electrode plate 14 to isolate the first electrode plate 12 and second electrode plate 14. In an embodiment of the present application, the first electrode plate 12 may be an anode plate, and the second electrode plate 14 may be a cathode plate; in an alternative embodiment, the first electrode plate 12 may be a cathode plate, and the second electrode plate 14 may be an anode plate.

Further, as shown in FIGS. 1 and 2, the separator 16 may include an extension portion 18 extending to the outside of the first electrode plate 12 and the second electrode plate 14 in a length direction L of the electrode assembly 10, and the extension portion 18 may be connected by a glue layer 20. As shown in FIG. 1, the glue layer 20 may include a first bonding portion 22 extending in a width direction W of the electrode assembly 10. In other words, the first bonding portion 22 of the glue layer 20 extends parallel to the width direction W of the electrode assembly 10.

In this way, the extension portions 18 of the separator 16 may be bonded by the glue layer 20, thereby effectively improving the safety problems of the battery due to the shrinkage of the separator (such as a drop short circuit, etc.). In addition, since the first bonding portion 22 included in the glue layer 20 extends in the width direction W of the electrode assembly is parallel to the width direction W, the bonding portion 22 may increase the restriction points of the extension portion 18 of the separator when bonding (i.e., increases the bonding area with the extension portion 18). So that the extension portion 18 of the separator 16 may be effectively restricted, and the shrinkage of the separator is prevented, thereby reduces the risk of short circuit of the electrode assembly.

In an embodiment of the present application, as shown in FIG. 1, the glue layer 20 may be configured in a wave structure in the width direction W of the electrode assembly 10. When the glue layer 20 is configured in a wave structure and includes the first bonding portion 22 extending in the width direction W, all of the extension portions 18 may be firmly connected. Therefore effectively increases the restriction points of the extension portions 18 of the separator, and facilitates entry of the electrolyte into the interior of the electrode assembly 10. Alternative embodiments of the wave structure of the glue layer 20 will be described in the following embodiments.

With continuous reference to FIG. 1, in a thickness direction T of the electrode assembly 10 (perpendicular to the width direction W of the electrode assembly 10), the extension portion 18 includes a first layer 24 and a second layer 26 located on the outermost sides in the thickness direction T of the electrode assembly 10. And the first bonding portion 22 is located on the first layer 24. In specific, in the embodiments shown in FIGS. 1 and 2, the first layer 24 may form a top outermost ring portion of the extension portion 18 and the second layer 26 may form a bottom outermost ring portion of the extension portion 18. In other words, in the thickness direction T, the outermost ring in the extension portion 18 near the top of the entire electrode assembly 10 may form the first layer 24; by contrast, the outermost ring in the extension portion 18 near the bottom of the entire electrode assembly 10 may form the second layer 26.

Further, as shown in FIG. 1, the glue layer 20 may also include a second bonding portion 28 extending in the width direction W of the electrode assembly 10, and the second bonding portion 28 is parallel to the width direction W. And the second bonding portion 28 is located on the second layer 26. Thus, when the first bonding portion 22 and the second bonding portion 28 are located on the first layer 24 and the second layer 26, respectively, a structure shown in FIG. 1 may be formed.

At this time, the outermost separator of the electrode assembly 10 (i.e., the first layer 24 or the top outermost ring portion and the second layer 26 or the bottom outermost ring portion), which is most susceptible to shrink due to the electrolyte shock, may be effectively bonded by the glue layer 20, so that the bonding reliability of the separator in the outermost ring is greatly improved, thereby effectively eliminating the shrinkage. For a wave-coated electrode assembly with a peak of only one point, the bonding in the peak is weak. Since the peak in the present embodiment is the first bonding portion 22 and the second bonding portion 28 extending in the width direction W of the electrode assembly 10, the bonding area at the first layer 24 and the second layer 26 is increased, and the bonding strength is increased.

Other alternative configurations of the electrode assembly 10 of the present application are described below with continued reference to the accompanying drawings. It should be understood that the above description and the following description are all alternative embodiments of the electrode assembly 10 of the present application, and various embodiments may be combined with one another to form other embodiments not shown in the figures or described herein. Therefore, the description herein is intended to be illustrative, and is not intended to limit the present application.

Figure 3:
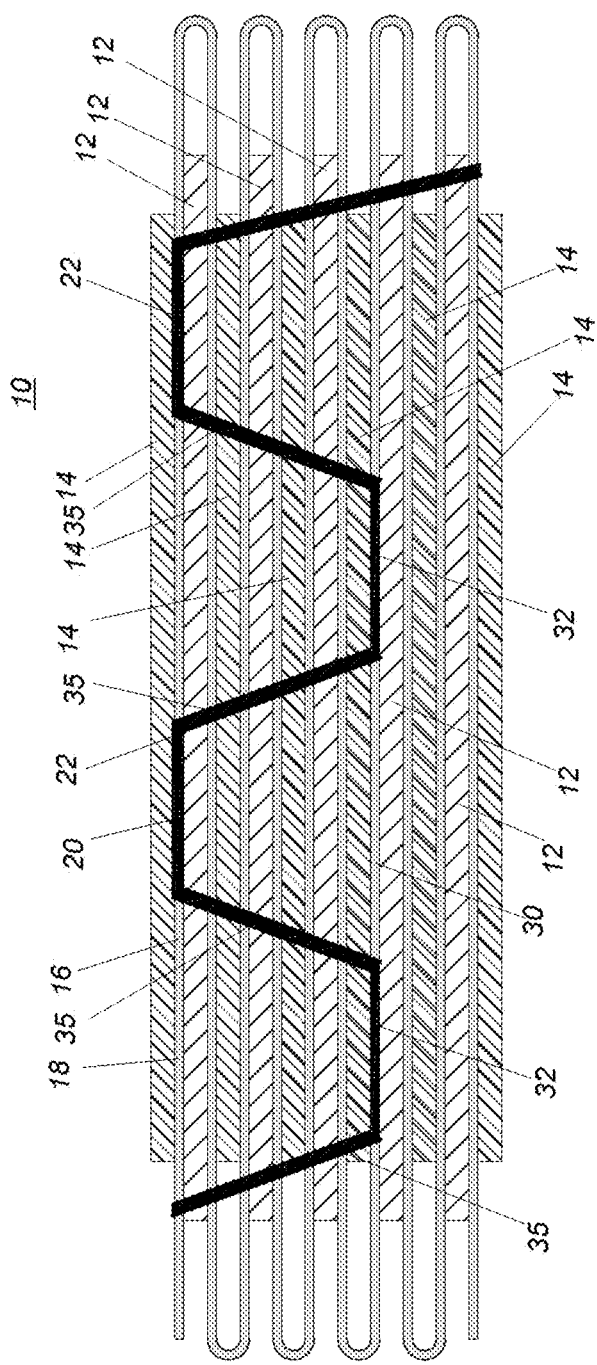
FIG. 3 is a front view of an alternative configuration of an electrode assembly in accordance with an embodiment of the present application.

As shown in FIG. 3, different from the embodiment shown in FIG. 1, in the embodiment shown in FIG. 3, the glue layer 20 includes a third bonding portion 32 in addition to the first bonding portion 22 on the first layer 24. In specific, in the thickness direction T of the electrode assembly 10, the extension portion 18 also includes a third layer 30, and the third layer 30 is located between the first layer 24 and the second layer 26. In other words, the extension portion 18 may include one or more intermediate layers stacked in the thickness direction T, wherein when the intermediate layer includes a single layer, the layer is the third layer 30 as described above. When the intermediate layer includes a plurality of layers, any layer of the intermediate layer may be the third layer 30 as described above. In the embodiments described in this disclosure, the intermediate layer includes a plurality of layers and the third layer 30 may be any layer therein.

With continuous reference to FIG. 3, the glue layer 20 includes a first bonding portion 22 and a third bonding portion 32. Wherein the third bonding portion 32 located on the third layer 30 extends in the width direction W of the electrode assembly 10, so that a structure as shown in FIG. 3 may be formed.

Figure 4:
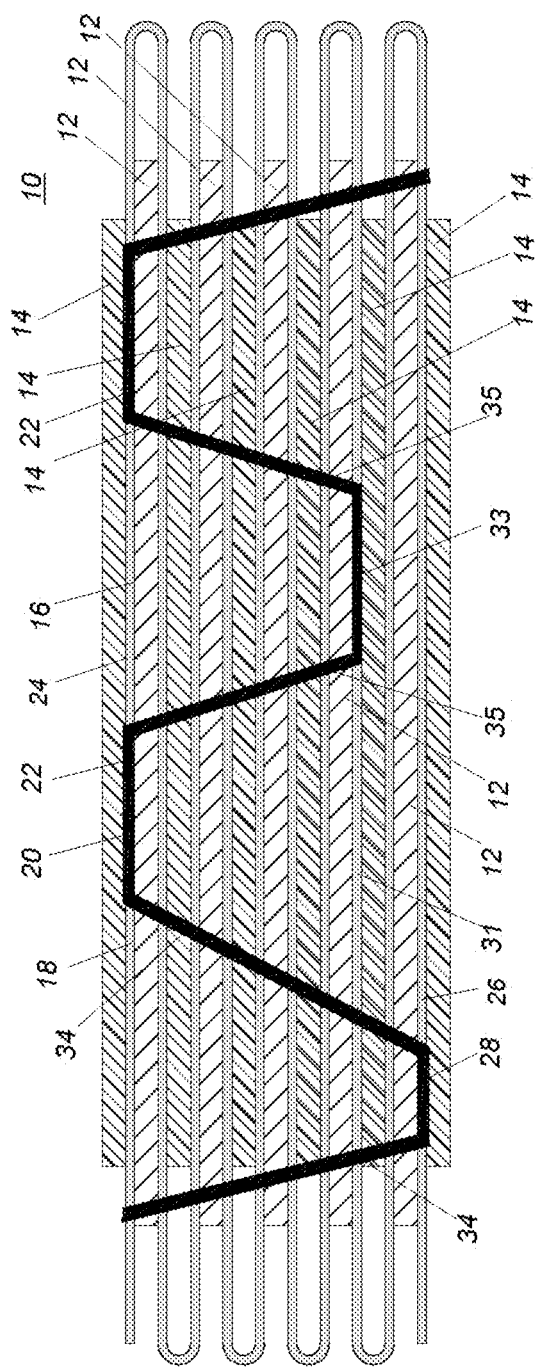
FIG. 4 is a front view of an alternative configuration of an electrode assembly in accordance with an embodiment of the present application.

With continuous reference to FIG. 4, different from the embodiment of FIG. 3, the glue layer 20 of the present embodiment shown in FIG. 4 includes the first bonding portion 22, the second bonding portion 28, and the third bonding portion 33 at the same time. In the embodiment shown in FIG. 4, there is also a third layer 31 similar to the third layer 30 in FIG. 3, and the third bonding portion 33 extends in the width direction W of the electrode assembly 10. Wherein the third bonding portion 33 is located on the third layer 31. At this time, the formed structure includes both the first bonding portion 22 located on the first layer 24, the second bonding portion 28 located on the second layer 26, and the third bonding portion 33 located on the third layer 31.

Since the bonding portions (e.g., the first bonding portion 22, the second bonding portion 28, and the third bonding portion 33) of the plurality of different positions are simultaneously included, the glue layer 20 may be integrally formed in the irregular shape shown in FIG. 4. For example, in an alternative embodiment, in the width direction W of the electrode assembly 10, the adjacent bonding portions may be positioned at intervals or with vary distances, and the length of each bonding portion may be the same or different. In an alternative embodiment, as further shown, the vertical distance between adjacent bonding portions may be the same or different in the thickness direction T of the electrode assembly 10. The various configurations described above do not constitute any limitation to the present application, and the present application is not limited thereto.

Referring to FIG. 1 again, in the embodiment of the present application, the glue layer 20 further includes a fourth bonding portion 34. In specific, the fourth bonding portion 34 is located between the first bonding portion 22 and the second bonding portion 28, and an angle between the fourth bonding portion 34 and the width direction W of the electrode assembly 10 is greater than 0 degrees and less than 180 degrees. Different from the embodiment shown in FIG. 1, there is no second bonding portion 28 but a third bonding portion 32 in the embodiment shown in FIG. 3, therefore the fourth bonding portion 35 in FIG. 3 is connected between the first bonding portion 22 and the third bonding portion 32.

As shown in FIG. 1, in this way, the glue layer 20 formed has a continuously extending trapezoidal wave structure. In the embodiment shown in FIG. 1, firstly, forming a first trapezoidal shape with an upward and gradually enlarged opening on the leftmost side. Secondly, forming a second trapezoidal shape with a downward and gradually enlarged opening (that is, rotating the first trapezoidal shape 180° to obtain the second trapezoidal shape). Finally, arranging the first and second trapezoidal shapes alternatively to constitute the structure shown in FIG. 1.

Figure 5:
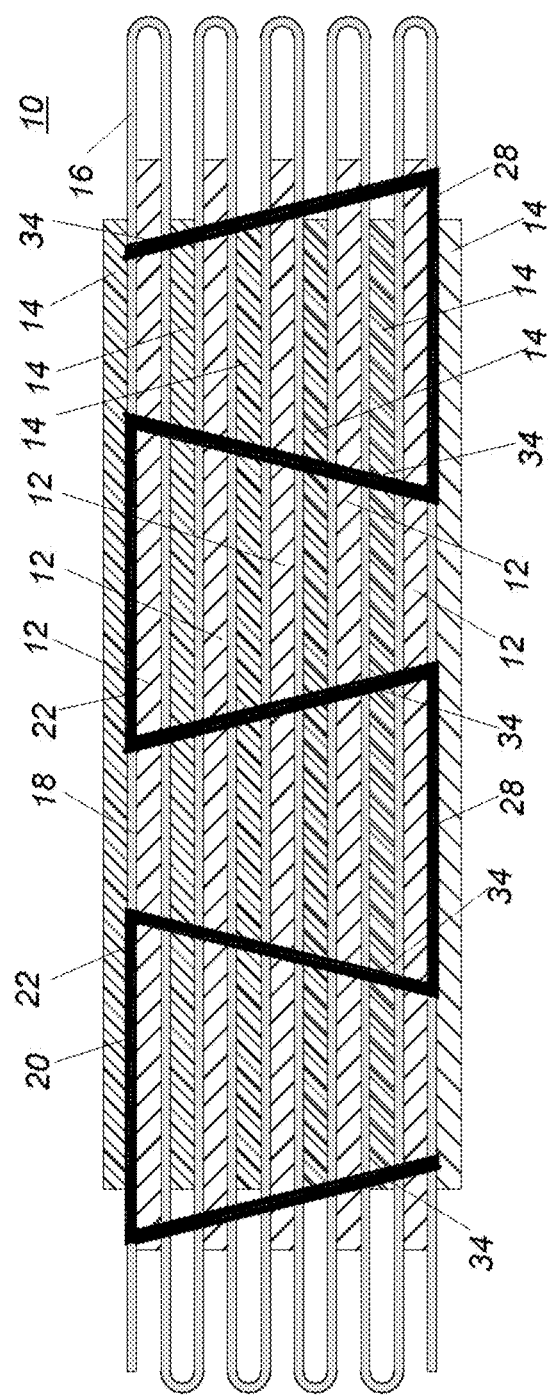
FIG. 5 is a front view of an alternative configuration of an electrode assembly in accordance with an embodiment of the present application.

Opposite to the embodiment shown in FIG. 1, in the embodiment shown in FIG. 5, a first trapezoidal shape with a downward and gradually reduced opening is firstly formed on the leftmost side. Secondly, a second trapezoidal shape with an upward and gradually reduced opening is form (that is, the first trapezoidal shape is rotated 180° to form the second trapezoidal shape). Finally, the first and second trapezoidal shapes are arranged alternatively to constitute the structure as shown in FIG. 5.

That is, in the above two embodiments, the present application does not limit the specific configuration of the trapezoidal shape formed. The trapezoidal shape may be adjusted to adapt to different embodiments depending on the actual situation and needs.

Figure 6:
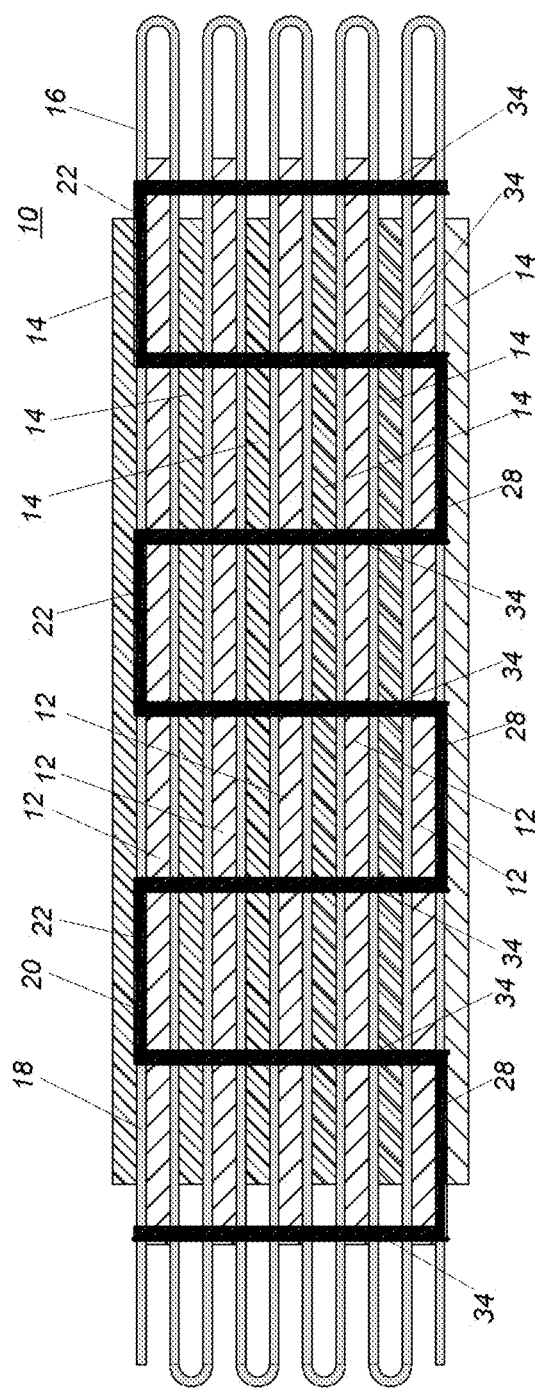
FIG. 6 is a front view of an alternative configuration of an electrode assembly in accordance with an embodiment of the present application.
Figure 7:
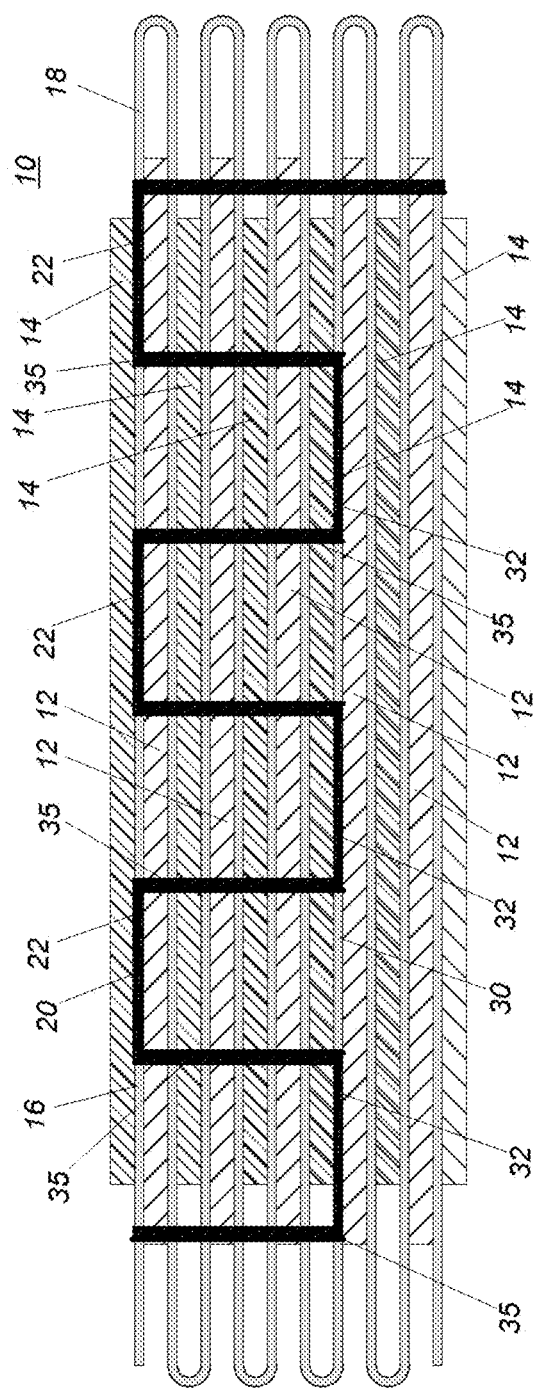
FIG. 7 is a front view of an alternative configuration of an electrode assembly in accordance with an embodiment of the present application.

With continuous reference to FIG. 6, for the embodiment in which the glue layer 20 includes the first bonding portion 22 and the second bonding portion 28, an angle between the fourth bonding portion 34 and the width direction W of the electrode assembly 10 is 90 degrees. Thereby, the fourth bonding portion 34 is simultaneously perpendicular to the first bonding portion 22 and the second bonding portion 28, thus forming a rectangular wave structure as shown in FIG. 6. With reference to FIG. 7, for the embodiment in which the glue layer 20 includes the first bonding portion 22 and the third bonding portion 32, an angle between the fourth bonding portion 35 and the width direction W of the electrode assembly 10 is 90 degrees. Thereby, the fourth bonding portion 35 is simultaneously perpendicular to the first bonding portion 22 and the third bonding portion 32, thus forming a rectangular wave structure as shown in FIG. 7.

Figure 8:
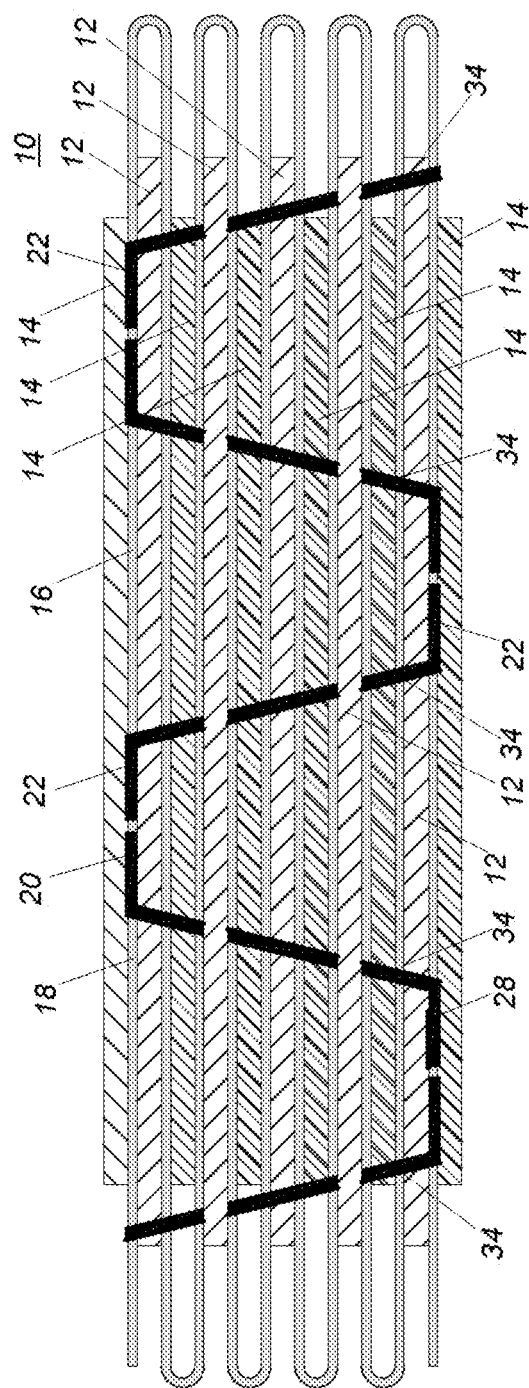
FIG. 8 is a front view of an alternative configuration of an electrode assembly in accordance with an embodiment of the present application.

As shown in FIG. 8, in the present embodiment, the glue layer 20 has a discontinuous wave structure. In other words, each of the bonding portions as described above may be configured to include a plurality of segments. Except for the plurality of spaced segments respectively included in the first bonding portion 22, the second bonding portion 28, and the fourth bonding portion 34, the overall structure shown in FIG. 8 is similar to that shown in FIG. 1. It should be understood that such a multi-segment structure may also be applied to the embodiments shown in the other figures.

Figure 9:
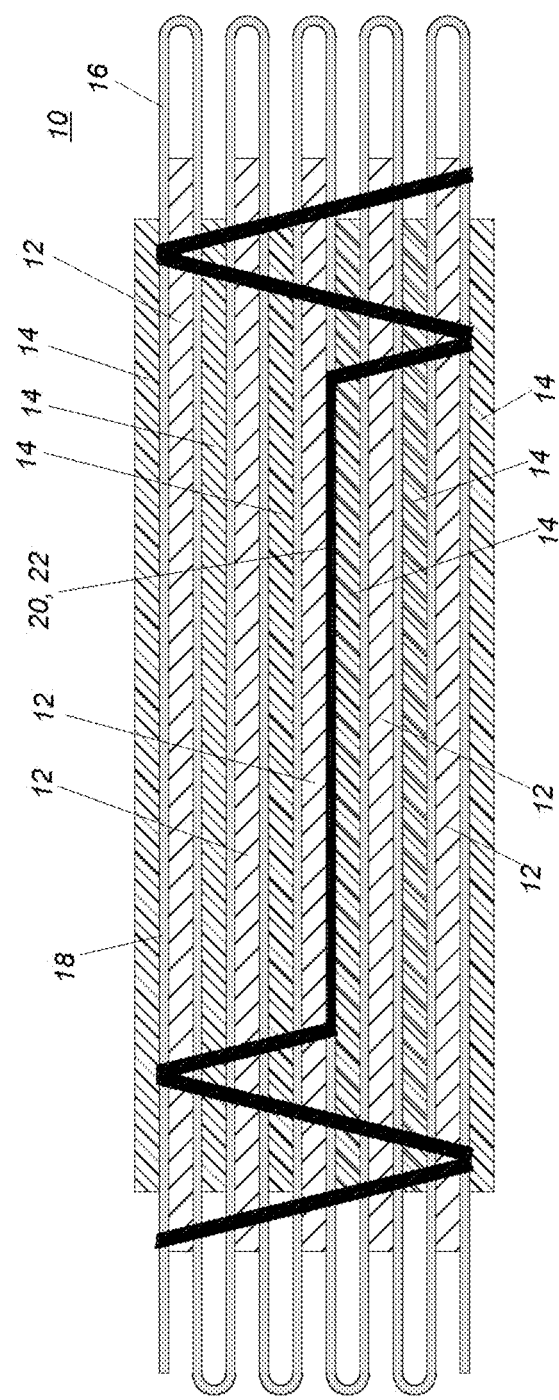
FIG. 9 is a front view of an alternative configuration of an electrode assembly in accordance with an embodiment of the present application.
Figure 10:
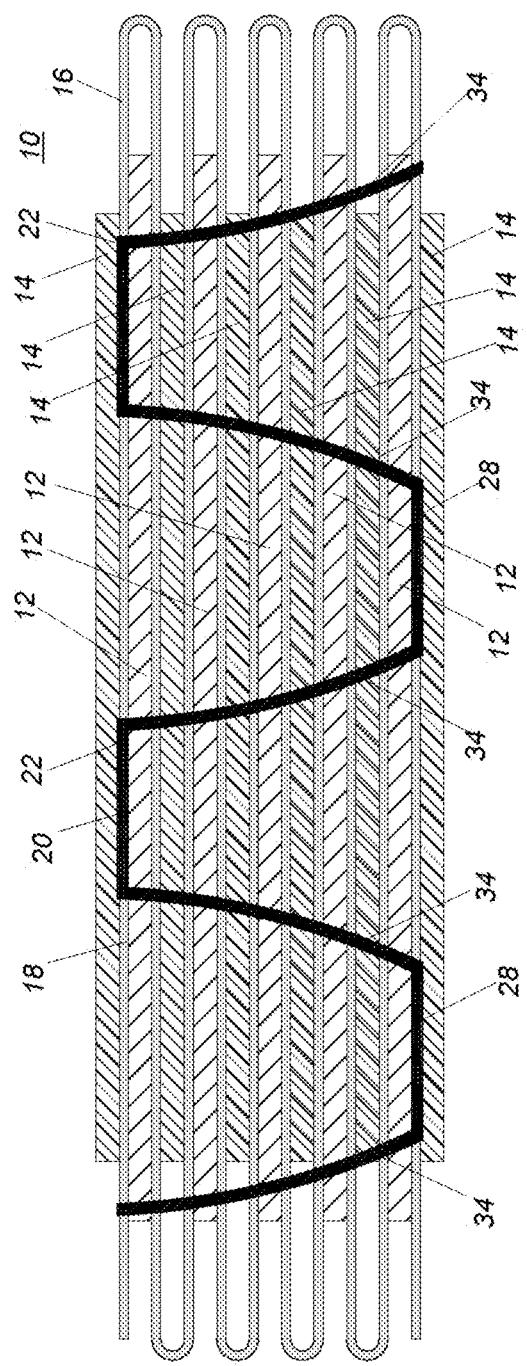
FIG. 10 is a front view of an alternative configuration of an electrode assembly in accordance with an embodiment of the present application.
Figure 11:
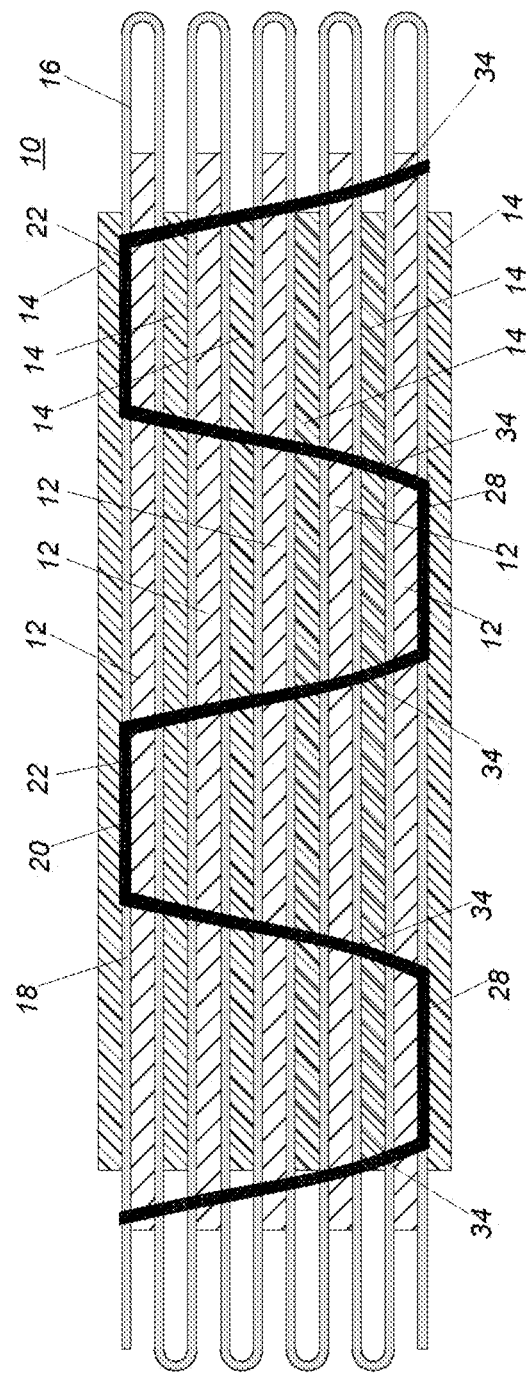
FIG. 11 is a front view of an alternative configuration of an electrode assembly in accordance with an embodiment of the present application.

Furthermore, as shown in FIG. 9, in an alternative embodiment, the first bonding portion 22 may be arranged at the center of the electrode assembly 10, and may include a plurality of bonding portions arranged obliquely on both sides of the first bonding portion 22. Further, as shown in FIG. 10, the overall structure of the glue layer is similar to that of the embodiment shown in FIG. 1, except that the fourth bonding portion 34 is curved. Further, the curved shape of the fourth bonding portion 34 may be a smooth curve as shown in FIG. 10 or a non-smooth curve including a plurality of curved segments as shown in FIG. 11.

In other words, the parameters such as the size, the shape, the spacing, and the like of each bonding portion of the glue layer 20 are not limited to the present application, and any suitable parameters may be selected depending on the particular application to form various embodiments that are not exhaustively described in the specification of the present application.

In addition, the glue layer 20 of the wave structure provided above in the present application facilitates the filtration of the electrolyte. In the end, the glued wave structure greatly increases the adhesion effect on the separator, which may effectively improve the safety of the electrode assembly caused by the shrinkage of the separator (such as a drop short circuit, etc.). In addition, since the first bonding portion 22 included in the glue layer 22 extends in the width direction W of the electrode assembly and being parallel to the width direction W, therefore it may increase the restriction point of the extension portion 18 of the separator when bonding (i.e., increase the bonding area with the extension portion 18). So that the extension portion 18 of the separator 16 may be effectively restricted, and shrinkage of the separator 16 is prevented, thereby reducing the risk of short circuit of the electrode assembly.

In another aspect, the present application further provides a battery including a packaging housing, an electrolyte, and the electrode assembly 10 as described above, wherein the electrode assembly 10 and the electrolyte are contained in the packaging housing. For example, in practical applications, the packaging housing may be an aluminum plastic film or a metal housing.

As noted above, in an alternative embodiment, the electrode assembly 10 may be formed by winding or lamination.

Since the electrode assembly 10 as described above is provided in the battery, the battery also has all the advantages and effects as described above.

The foregoing is merely illustrative of the embodiments of the present application and is not intended to be limiting of the present application, and various changes and modifications may be made by those skilled in the art. Any modifications, equivalent substitutions, improvements, and the like within the spirit and principles of the application are intended to be included within the scope of the present application.

What is claimed is:

1. An electrode assembly, comprising: a first electrode plate, a second electrode plate, and a separator disposed there between;
wherein the separator comprises an extension portion extending beyond the first electrode plate and the second electrode plate in a length direction of the electrode assembly; and the extension portion is provided with a glue layer, and the glue layer comprises a first bonding portion extending in a width direction of the electrode assembly; and the first bonding portion is bonded to the extension portion of the separator;
wherein the glue layer is configured in a wave structure in the width direction of the electrode assembly.

2. The electrode assembly according to claim 1, wherein in a thickness direction of the electrode assembly, the extension portion comprises a first layer and a second layer, located on the outermost sides of the electrode assembly respectively, and the first bonding portion is located on the first layer.

3. The electrode assembly according to claim 2, wherein the glue layer further comprises a second bonding portion extending in the width direction of the electrode assembly, and the second bonding portion is located on the second layer.

4. The electrode assembly according to claim 3, wherein in the thickness direction of the electrode assembly, the extension portion further comprises a third layer located between the first layer and the second layer;
the glue layer further comprises a third bonding portion extending in a width direction of the electrode assembly; and
the third bonding portion is located on the third layer.

5. The electrode assembly according to claim 3, wherein the glue layer further comprises a fourth bonding portion, located between the first bonding portion and the second bonding portion, and an angle between the fourth bonding portion and the width direction of the electrode assembly is greater than 0 degrees and less than 180 degrees.

6. The electrode assembly according to claim 5, wherein the angle between the fourth bonding portion and the width direction of the electrode assembly is 90 degrees.

7. The electrode assembly according to claim 2, wherein in the thickness direction of the electrode assembly, the extension portion further comprises a third layer located between the first layer and the second layer;
the glue layer further comprises a third bonding portion extending in the width direction of the electrode assembly; and the third bonding portion is located on the third layer.

8. The electrode assembly according to claim 7, wherein the glue layer further comprises a fourth bonding portion, located between the first bonding portion and the third bonding portion, and an angle between the fourth bonding portion and the width direction of the electrode assembly is greater than 0 degrees and less than 180 degrees.

9. The electrode assembly according to claim 8, wherein the angle between the fourth bonding portion and the width direction of the electrode assembly is 90 degrees.

10. The electrode assembly according to claim 1, wherein the glue layer is a discontinuous wave structure.

11. The electrode assembly according to claim 1, wherein the first electrode plate is an anode plate and the second electrode plate is a cathode plate.

12. A battery, comprising an electrode assembly, and a housing accommodating the electrode assembly;
wherein the electrode assembly comprises a first electrode plate, a second electrode plate, and a separator disposed therebetween;
the separator comprises an extension portion extending beyond the first electrode plate and the second electrode plate in a length direction of the electrode assembly; and the extension portion is provided with a glue layer, and the glue layer comprises a first bonding portion extending in a width direction of the electrode assembly; and the first bonding portion is bonded to the extension portion of the separator;
wherein the glue layer is configured in a wave structure in the width direction of the electrode assembly.

13. The battery according to claim 12, wherein in a thickness direction of the electrode assembly, the extension portion comprises a first layer and a second layer located on the outermost sides of the electrode assembly respectively, and the first bonding portion is located on the first layer.

14. The battery according to claim 13, wherein the glue layer further comprises a second bonding portion extending in the width direction of the electrode assembly, and the second bonding portion is located on the second layer.

15. The battery according to claim 14, wherein in the thickness direction of the electrode assembly, the extension portion further comprises a third layer located between the first layer and the second layer;

the glue layer further comprises a third bonding portion extending in a width direction of the electrode assembly; and the third bonding portion is located on the third layer.

16. The battery according to claim 14, wherein the glue layer further comprises a fourth bonding portion located between the first bonding portion and the second bonding portion, and an angle between the fourth bonding portion and the width direction of the electrode assembly is greater than 0 degree and less than 180 degrees.

17. The battery according to claim 13, wherein in the thickness direction of the electrode assembly, the extension portion further comprises a third layer located between the first layer and the second layer;

the glue layer further comprises a third bonding portion extending in the width direction of the electrode assembly; and the third bonding portion is located on the third layer.

18. The battery according to claim 17, wherein the glue layer further comprises a fourth bonding portion located between the first bonding portion and the third bonding portion, and an angle between the fourth bonding portion and the width direction of the electrode assembly is greater than 0 degree and less than 180 degrees.

* * * * *